United States Patent
Kubo (10) Patent No.: US 11,573,473 B2
(45) Date of Patent: Feb. 7, 2023

(54) ELECTROCHROMIC DEVICE

(71) Applicant: CANON KABUSHIKI KAISHA, Tokyo (JP)

(72) Inventor: Wataru Kubo, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 641 days.

(21) Appl. No.: 16/199,572

(22) Filed: Nov. 26, 2018

(65) Prior Publication Data
US 2019/0163027 A1    May 30, 2019

(51) Int. Cl.
| | |
|---|---|
| G02B 7/00 | (2021.01) |
| G02F 1/153 | (2006.01) |
| G02F 1/1523 | (2019.01) |
| G02F 1/161 | (2006.01) |
| G02F 1/155 | (2006.01) |

(52) U.S. Cl.
CPC ............. *G02F 1/1533* (2013.01); *G02F 1/155* (2013.01); *G02F 1/1525* (2013.01); *G02F 1/161* (2013.01)

(58) Field of Classification Search
CPC ...... G02F 1/1533; G02F 1/1525; G02F 1/161; G02F 1/155; G02F 1/153; G02F 1/157; G02F 1/15; G02F 2001/1552; G02F 2001/1555; G02F 2001/1557; G02F 2001/1536; G02F 2001/1502; G02F 1/1635; G02F 1/163; G02F 1/1675; G02F 1/16753; G02F 1/1676; G02F 1/16761; G02F 1/1677; G02F 1/1679; G09G 3/38; G09G 3/19; B32B 17/10513; B60R 1/088
USPC .................. 359/896, 265, 273, 275; 345/105
See application file for complete search history.

(56) References Cited

U.S. PATENT DOCUMENTS

| | | | |
|---|---|---|---|
| 6,010,220 A | 1/2000 | Smarto | |
| 6,317,248 B1* | 11/2001 | Agrawal | G02F 1/155 340/438 |
| 8,711,465 B2* | 4/2014 | Bhatnagar | B32B 17/10513 359/275 |
| 10,372,005 B2 | 8/2019 | Kubo et al. | |
| 2007/0002422 A1* | 1/2007 | O'Shaughnessy | G02F 1/155 359/265 |
| 2009/0303565 A1* | 12/2009 | Karmhag | G02F 1/1533 359/265 |
| 2011/0267673 A1* | 11/2011 | Agrawal | G02F 1/161 359/267 |
| 2017/0219901 A1* | 8/2017 | Kumai | G02F 1/163 |

FOREIGN PATENT DOCUMENTS

JP    2016-95503 A    5/2016

OTHER PUBLICATIONS

Notice of Reasons for Refusal in Japanese Application No. 2018-215520 (dated Jul. 2022).

* cited by examiner

Primary Examiner — Jade R Chwasz
Assistant Examiner — Jyotsna V Dabbi
(74) Attorney, Agent, or Firm — Venable LLP (57) ABSTRACT

An electrochromic device is provided in which resistance of a bus bar is reduced. This devices includes: a pair of base members; a pair of electrodes arranged between the pair of base members; an electrochromic layer arranged between the pair of electrodes; and at least one bus bar electrically connected to one of the pair of electrodes.

14 Claims, 8 Drawing Sheets

SECTIONAL PROCESS VIEW

FIG. 8C

PLAN VIEW

ELECTROCHROMIC DEVICE

BACKGROUND

Field of the Disclosure

The present invention relates to an electrochromic device.

Description of the Related Art

An EC device is a device using an electrochromic (hereinafter occasionally abbreviated as "EC") material in which properties of optical absorption (absorption wavelength and absorbance) of a substance change due to an electrochemical oxidation-reduction reaction. The EC device can achieve both of high transmittance during decoloring and low transmittance during coloring. By using the properties, the EC device is applied to display devices, variable reflectance mirrors, variable transmission windows and the like. It has been actively developed to enlarge the size of the device, as a direction of development for enhancing functions in these application fields or expanding the range of the applications. The EC device is a current-driven device of which the optical characteristics change basically according to the Faraday current flowing due to the electrochemical reaction of the EC material. Because of this, a larger electric current flows than that in a voltage-driven liquid crystal device often becoming an object to be compared, in many cases. In order to reduce the influence of the voltage drop due to the large electric current, a method for reducing the resistance of the EC device has been devised. As for the method of reducing the resistance of the device originating in the resistance of the transparent electrode used for the EC device, a bus bar (power-feeding electric wire) is widely used which applies a metal to the outside (mainly, on substrate) of an effective optical region of the device. In the case where the size of the EC device is enlarged, it is required to reduce the resistance of the bus bar caused by the increase in the electric current, because the electric current (current density) per unit area of the EC device usually does not change.

In order to reduce the resistance of the bus bar, it is acceptable to increase the cross-sectional area of the bus bar, and accordingly it is acceptable to increase the width and thickness of the bus bar, on a simple level. However, there are restrictions in the increase of the width and thickness, due to the functions of the EC device. The increase of the width of the bus bar results in increasing a bezel portion (of ineffective optical region), which is a peripheral region of an effective optical region of the EC device (region in which the EC device absorbs light in order to show its function). The increase results in increasing, for example, the peripheral portions of the display device, the variable reflectance mirror, the variable transmission window and the like which are the applications of the EC device, and is not preferable from the viewpoints of the appearance and the function. In addition, the EC device often includes two opposing electrodes, but there is a limit in an increase of the thickness of the bus bar, because the increase causes a short circuit due to contact with an opposing electrode. Because of this, it is required to reduce the resistance of the bus bar without expanding the space of the bus bar.

U.S. Pat. No. 6,010,220 (hereinafter referred to as PTL1) discloses an electrochromic lens in which a bus bar having a tab buried in an electroconductive epoxy is positioned on the side of a base member. The arrangement of the bus bar onto the side is effective in avoiding a short circuit with the counter electrode, which occurs due to thickening of the bus bar.

However, according to the method of the PTL1, projection toward the side occurs, and accordingly there is a problem that the bezel portion increases.

SUMMARY

The present disclosure is designed to solve the above described problems, and an object thereof is to provide an EC device in which the resistance of the bus bar is reduced without expanding the space of the bus bar.

The present embodiment provides an electrochromic device including: a pair of base members; a pair of electrodes arranged between the pair of base members; an electrochromic layer arranged between the pair of electrodes, and at least one bus bar electrically connected to the electrode, wherein an arranging portion for the bus bar is provided in the base member or the electrode, and at least one part of the bus bar is arranged in the arranging portion.

In addition, the present embodiment provides an electrochromic device including: a pair of base members; a pair of electrodes arranged between the pair of base members; an electrochromic layer arranged between the pair of electrodes; and bus bars connected to the pair of electrodes, respectively, wherein the base member or the electrode has a concave portion which increases a distance between the bus bar connected to one of the pair of electrodes and the bus bar connected to the other of the pair of electrodes.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An electrochromic device according to the present embodiment includes: a pair of base members; a pair of electrodes arranged between the pair of base members; an electrochromic layer arranged between the pair of electrodes, and at least one bus bar electrically connected to the electrode. Then, an arranging portion for the bus bar is provided in the base member or the electrode, and at least one part of the bus bar is arranged in the arranging portion. The arranging portion provided in the base member or the electrode may be a concave portion. The bus bar may be arranged so as to be embedded in this concave portion.

In addition, the electrochromic device according to the present embodiment includes: a pair of base members; a pair of electrodes arranged between the pair of base members; an electrochromic layer arranged between the pair of electrodes; and bus bars connected to the pair of electrodes, respectively. Then, the base member or the electrode has a bus bar separating unit which increases a distance between the bus bar connected to one of the pair of electrodes and the bus bar connected to the other of the pair of electrodes. The bus bar separating unit may be a concave portion provided in the base member or the electrode. The bus bar may be arranged so as to be embedded in this concave portion.

A short circuit between the bus bars can be suppressed by the arranging portion for the bus bar or the bus bar separating unit which has been provided. Because the short circuit between the electrodes is suppressed, the distance between the electrodes may be 100 μm or less. Furthermore, the distance between the electrodes may be 25 or more and 100 μm or less.

First Embodiment

Figure 1A:
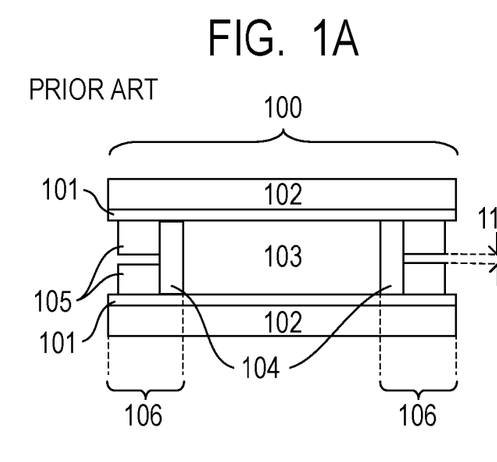
FIG. 1A illustrates a schematic diagram illustrating a conventional EC device.
Figure 1B:
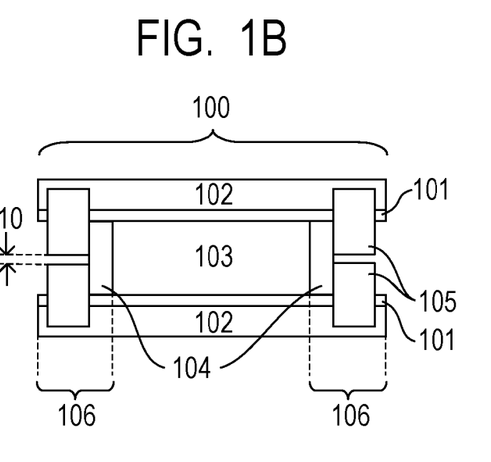
FIG. 1B illustrates a schematic diagram for describing an outline of an EC device of a first embodiment.
Figure 2A:
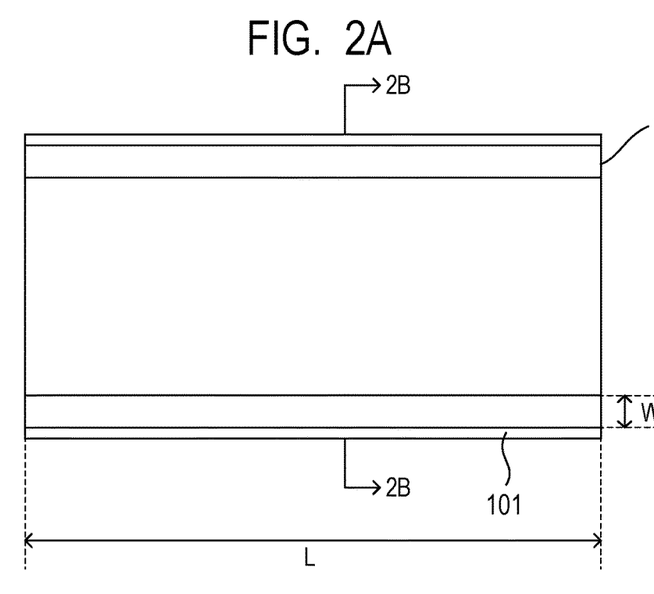
FIGS. 2A and 2B illustrate schematic diagrams illustrating a base member used in the EC device of FIG. 1B.
Figure 2B:
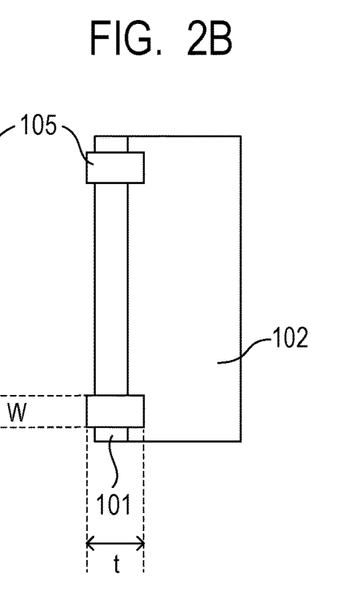

FIGS. 1A and 1B illustrate schematic diagrams for describing an outline of an electrochromic device of a first embodiment; and illustrate sectional views on a plane orthogonal to a longitudinal direction of the EC device. FIG. 1A is an EC device for comparison (hereinafter occasionally referred to as "comparable device"); and FIG. 1B is the EC device of the present embodiment. FIGS. 2A and 2B illustrate schematic diagrams illustrating a base member used in the EC device of FIG. 1B; FIG. 2A is a plan view; and FIG. 2B is a sectional view in 2B-2B of FIG. 2A.

In FIGS. 1A and 1B, the EC device 100 has a pair of facing electrodes 101 for coloring or decoloring the device, at least one of which is transparent. The electrodes 101 can be used which are arranged on a pair of facing base members 102, respectively, at least one of which is transparent. In a space between the electrodes 101, an electrochromic layer 103 is arranged of which optical transmittance changes due to application of a voltage, and an EC layer 103 is isolated from the outside by a partition wall 104 as needed.

The EC device 100 of the present embodiment has at least one bus bar (power-feeding electric wire) 105, which is electrically connected to the electrode 101 and applies a driving voltage to the electrode 101. The basic function of the bus bar 105 is to assist an electric conduction of the electrode 101 (in particularly, transparent electrode) having a higher resistance value than that of metal, and to uniformize a potential distribution within a plane of the electrode 101. Because of this, an electrical resistance of the bus bar 105 can be smaller than the electrical resistance of the electrode 101. In addition, as illustrated in FIG. 2A, the bus bar 105 can be arranged so that the longitudinal direction (horizontal direction in FIG. 2A) of the bus bar 105 having the length L, the width W and the thickness t becomes parallel to the longitudinal direction (horizontal direction in FIG. 2A) of the electrode 101. In addition, as illustrated in FIG. 2B, the bus bar 105 can be embedded in the electrode 101 and the base member 102. It can be also said that a way of arranging the bus bar 105 as illustrated in FIG. 2B means that the bus bar is arranged in the bus bar arranging portion or the bus bar separating unit provided in the electrode 101 and the base member 102, and can be arranged in the concave portion.

A resistance of a conductor having three-dimensional electroconductivity is generally represented by an expression (1).

$$R=\rho L/A=\rho L/Wt \tag{1}$$

(R: resistance, ρ: resistivity of conductor, L: length of conductor, A: cross-sectional area of conductor, W: width of conductor, and t: thickness of conductor)

Here, suppose that an EC device has a driving current density of I, a length in the longitudinal direction of the bus bar 105 of L, and a unit width (width=1). At this time, the voltage drop in the bus bar 105 is given by a product of the resistance of the bus bar 105 and a current flowing through the bus bar 105, and accordingly is expressed by an expression (2).

$$\Delta V=ILR=(I\rho L^2)/Wt \tag{2}$$

Figure 3:
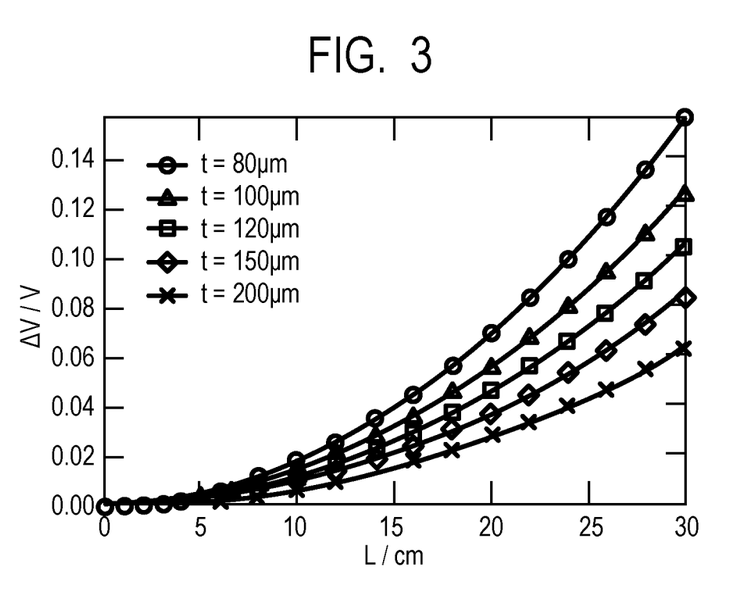
FIG. 3 illustrates a graph showing a relationship between a length of a bus bar and a voltage drop.

FIG. 3 illustrates a relationship between the length L of the bus bar 105 and the voltage drop ΔV in the EC device 100 when the thickness t of the bus bar 105 has been changed. In FIG. 3, $\rho=5\times10^{-5}$ Ωkm, W=0.2 cm and I=5.5 mAcm$^{-2}$ are assumed. From here, it is confirmed that in the case where the resistivity of the bus bar 105 is assumed to be constant and the length of the bus bar 105 (length of EC device 100 in the present embodiment) L has been changed to n times, the voltage drop in the bus bar 105 becomes $n^2$ times. To put it another way, in order to keep the voltage drop in the bus bar 105 constant, it is necessary to set the cross-sectional area (thickness t×width W) of a plane orthogonal to the longitudinal direction of the bus bar 105, at $n^2$ times. As described above, in order to maintain characteristics also in an enlarged device, the cross-sectional area of the bus bar 105 needs to be increased quadratically with respect to the length of the device. On the other hand, from a practical point of view, there are restrictions on a space of the bus bar 105 such as an area of a bezel portion 106 of an ineffective optical region, which becomes a peripheral region of an effective optical region (region which absorbs light to exhibit device function) of the EC device 100, a proportion occupying in the whole device, and a distance between the electrodes 101. In the present embodiment, at least one part of the bus bar 105 shall be embedded in the base member 102 or the electrode 101, in order to achieve both of the characteristics and the space.

Specifically, in the comparable device, the bus bar 105 is formed on the electrode 101 as illustrated in FIG. 1A, but in the EC device 100 of the present embodiment, the bus bar 105 is formed so that one part of the bus bar 105 is embedded in the electrode 101 and the base member 102 as illustrated in FIG. 1B. Thereby, the thickness t of the bus bar 105 can be increased, compared to that of the comparable device, while the gap 110 between the bus bars 105 is kept. Accordingly, the cross-sectional area of the bus bar 105 can be increased, compared to that of the comparable device, even though the width W of the bus bar 105 is not increased. As a result, the resistance of the bus bar 105 can be reduced, compared to that of the comparable device, while the width of the bezel portion 106 of the EC device 100 is maintained or reduced. If the width of the bezel portion 106 is reduced, the proportion of the effective optical region occupying in the device can be increased. Due to the above description, EC devices can be provided, for example, which have a compacted size of the whole device, or which are excellent in appearance. Furthermore, the height of the portion protruding from the surface of the electrode 101 of the bus bar 105 is lowered than that of the comparable device, and thereby the distance between the two electrodes 101 can be shortened. As a result, the degree of freedom in designing the thickness of the EC layer 103 can be enhanced. Specifically, the EC device can improve a response speed and control concentration, by reducing the distance between the electrodes (thickness of EC layer 103).

A base material of the bus bar 105 is not particularly limited, and any material is used as long as the material has high electroconductivity per unit volume. Basically, a metal material is used, and among the metal materials, silver, copper, aluminum or the like can be used. A method of forming the bus bar 105 of the present embodiment can be selected without being particularly limited. As an example, there is a method of preparing the base member 102 previously subjected to digging processing and then forming the bus bar 105. As for the digging processing method for the base member 102, a method corresponding to a base material of the base member 102 can be selected. For example, if the base member 102 is made of glass, the method can include techniques of laser processing, etching, ultrasonic processing, and grinding. As for a method of forming the bus bar 105, a method corresponding to base materials of both the bus bar 105 and the base member 102 can be selected. Specifically, techniques such as printing using a metal paste, sputtering and plating can be used. In addition to these forming methods, techniques such as patterning and polishing are used, and thereby the bus bar 105 can be formed into a desired shape.

Hereinafter, each component illustrated in FIGS. 1A, 1B, 2A and 2B will be specifically described.

The EC device 100 is a device which can electrically change an amount of absorbed light. The EC device 100 may be any form of a transmission type EC device, a reflection type EC device, a light scattering type EC device and the like. In the EC device 100, there are an EC device using an inorganic material and an EC device using an organic material, and the EC devices using the organic material include EC devices using a polymer organic material and using a low molecular organic material. Any device can be used as the EC device 100 of the present embodiment. In particular, the EC device using the low molecular organic material can be used, from the viewpoint of the contrast and the maximum transmittance. A control range of the light absorptance of the EC device 100 is not particularly limited, but it is desirable to secure such a range as to satisfy performances in application fields of an anti-glare mirror and a light control window, for example. A specific numerical value ideally includes a value between 0% and 99.999%, and actually includes a value between 1% and 99.9%. The control of the light absorptance in between the values may be made by only ON/OFF, but can be made by a plurality of gradations or stepless gradations.

An optically transparent base member is used for the base member 102. Here, "optical transparency" means that the corresponding base member, electrodes and the like transmit light, and the transmittance is 50% or more and 100% or less. Specifically, glass, a polymer compound or the like is used, and is subjected to coating such as antireflection, as needed.

As for the material of the electrode 101 formed on the base member 102, a material can be used which has transparency and electroconductivity and has stability during a reaction of the EC material. An example which can be used is an electrode of a transparent electroconductive oxide such as indium tin oxide (ITO) or fluorine-doped tin oxide. In addition, a material in which thin metal wires or thin films are arranged to reduce a resistance value or another electroconductive substance such as carbon nanotube may be used. When the EC device 100 is a reflection type EC device, a light reflective electrode may be used as the electrode 101 at the rear on the optical path. Specifically, metals, in particular, an electrochemically stable noble metal can be used. In this case, not the optically transparent electrode but an electrode which cannot transmit light may be used. Specifically, a metal can be used.

A material showing EC properties is used for the EC layer 103. In addition, the EC layer 103 may be a solid EC layer which has an EC material film-formed on the electrode 101, or a solution EC layer which has an EC material dissolved in a solvent. Examples of materials to be used for the EC layer 103 include the following materials. In the case of inorganic EC devices, inorganic EC materials such as tungsten oxide and iridium oxide are used; in the case of organic polymer EC devices, polymer organic EC materials such as polythiophene and polyaniline are used; and in the case of organic low molecular EC devices, the following organic low molecular EC materials are used. Examples of the organic low molecular EC material include derivatives of pyridine salts, and derivatives of aromatic amine compounds and heterocyclic compounds; and the chemical compounds may be used in a state of being dissolved in a solvent. This solvent is selected according to the application in consideration of a solubility of a solute including the EC material, a vapor pressure, viscosity, a potential window and the like, but can be a solvent having polarity. Specific examples thereof include: organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone and dioxolane; and water. In addition, the EC layer 103 may contain an electrolyte, a viscosity modifier, a UV stabilizer and the like, as needed. The viscosity modifier may be one which increases the viscosity of the EC layer 103 or may be one which decreases the viscosity, but can be the one which increases the viscosity. The increase of the viscosity of the EC layer 103 is advantageous for the case where the area of the light transmitting surface in the EC device 100 becomes large, in other words, for a trend of a larger area.

In order to hold the EC layer 103 between the two electrodes 101 and to keep the distance between both of the electrodes, a partition wall 104 can be used, and a sealing material can be used as the partition wall 104. The sealing material can be a material which is chemically stable, resists the permeation of a gas and a liquid, and does not inhibit an oxidation-reduction reaction of the EC material. Usable examples include: inorganic materials such as glass frit; organic materials such as an epoxy-based resin and an acrylic resin; and metals. Incidentally, the sealing material may have a function of holding the distance between the two electrodes 101, by containing a spacer material or the like. When the sealing material does not have the function of defining the distance between the electrodes 101, a spacer may be separately arranged to hold the distance between both of the electrodes. Usable base materials for the spacer include: inorganic materials such as silica beads or glass fibers; and organic materials such as polyimide, polytetrafluoroethylene, polydivinylbenzene, fluororubber and an epoxy resin. In addition, by the spacer, the distance between the electrodes 101 constituting the EC device 100 can be defined and held.

Second Embodiment

Figure 4A:
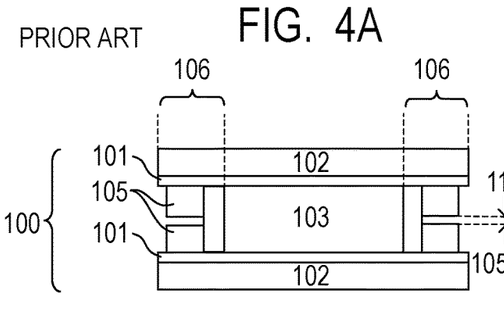
FIGS. 4A, 4B and 4C illustrate schematic diagrams for describing an outline of an EC device of a second embodiment.
Figure 4B:
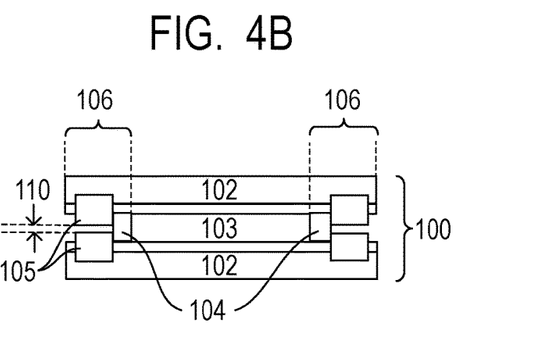
Figure 4C:
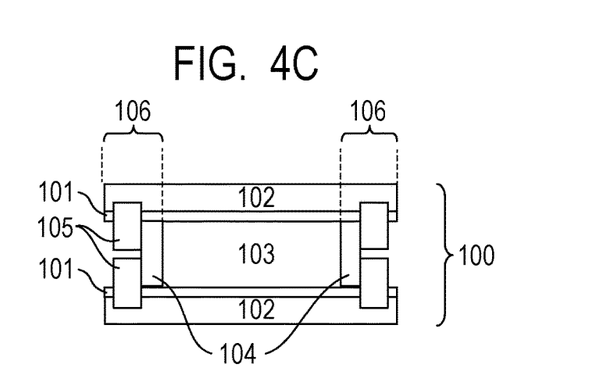

FIGS. 4A to 4C illustrate schematic diagrams for describing an outline of an EC device of a second embodiment, and illustrate sectional views on the same plane as those in FIGS. 1A and 1B. FIG. 4A illustrates an EC device for comparison, and FIGS. 4B and 4C illustrate EC devices of the present embodiment. The present embodiment is similar to the first embodiment, except that the resistance (cross-sectional area) of the bus bar 105 is matched with that of the comparable device.

In the EC device 100 of the present embodiment illustrated in FIG. 4B, one part of the bus bar 105 having a thickness t and a width W equal to those of the bus bar 105 of the comparable device is formed so as to be embedded in the electrode 101 and the base member 102. As a result, compared to the comparable device, the EC device of the present embodiment can shorten the distance between the two electrodes 101, while holding the gap 110 between the bus bars 105 and the thickness t of the bus bar 105. As a result, the EC device of the present embodiment can enhance the degree of freedom in designing the thickness of the EC layer 103. Specifically, the EC device can improve a response speed and control concentration, by reducing the distance between the electrodes (thickness of EC layer 103).

In addition, in the EC device 100 of the present embodiment illustrated in FIG. 4C, one part of the bus bar 105 having a larger thickness t than but having an equal sectional area to that of the bus bar 105 in the comparable device is formed so as to be embedded in the electrode 101 and the base member 102. As a result, the EC device of the present embodiment can reduce the bezel portion 106 while keeping the gap 110 between the bus bars 105 and the cross-sectional area of the bus bar 105. As a result, the proportion of the effective optical region occupying in the device can be increased. Due to the above description, EC devices can be provided, for example, which have a compacted size of the whole device, or which are excellent in appearance.

Third Embodiment

Figure 5A:
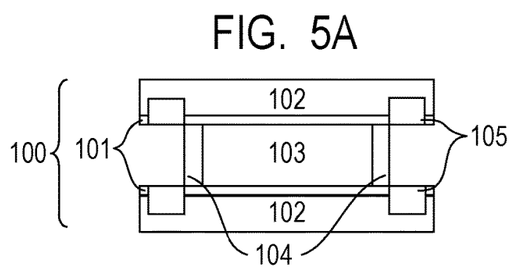
FIGS. 5A and 5B illustrate schematic diagrams for describing an outline of an EC device of a third embodiment.
Figure 5B:
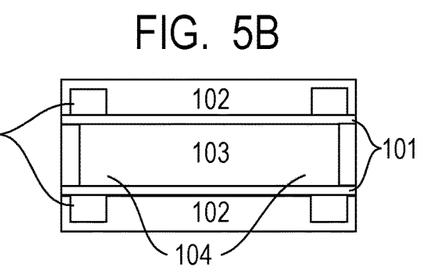

FIGS. 5A and 5B illustrate schematic diagrams for describing an outline of an EC device of a third embodiment, and illustrate sectional views on the same plane as that in FIGS. 1A and 1B. The present embodiment is similar to that in the first embodiment, except that the surface of the bus bar 105 becomes flush with the surface of the electrode 101, or is at a position recessed from the surface of the electrode 101.

In the EC device 100 illustrated in FIG. 5A, the bus bar 105 is arranged so that the surface of the bus bar 105 becomes flush with the surface of the electrode 101. In this case, the EC device can suppress that the bus bar 105 becomes convex with respect to the surface of the electrode 101, and thereby can avoid that the bus bar 105 becomes conspicuous, and can improve the appearance. Specifically describing, the EC device can pretend as if the bus bar 105 does not exist, and accordingly appears clean: and in addition, when the surface layer is coated, the step becomes inconspicuous, and the uniformity of the coating is enhanced.

In addition, in the EC device 100 illustrated in FIG. 5B, the bus bar 105 is arranged so that the surface of the bus bar 105 is at a position recessed from the surface of the electrode 101 and becomes flush with the surface of the base member 102. Furthermore, in the EC device 100 illustrated in FIG. 5B, the electrode 101 is arranged on the bus bar 105. In this case, the degree of freedom in material selection of the bus bar 105 is improved. Specifically, even a material reacting with the EC layer 103 at a potential at which the coloring/decoloring reaction proceeds in the EC layer 103, in the case where the bus bar 105 is brought into direct contact with the EC layer 103, can be selected as a material of the bus bar 105. In addition, as illustrated in FIG. 5B, the bus bar 105 can be also arranged in a region overlapping the effective optical region, which is desirable also in a point that the bezel portion 106 can be reduced or eliminated. The reduction of the bezel portion 106 means that the peripheral portion is reduced which does not directly relate to the function of the EC device 100, and accordingly provides advantages that the EC device 100 is miniaturized and appears clean because in the appearance, the peripheral portion (frame portion) decreases.

<<Application of Electrochromic Device>>

The electrochromic device according to the present embodiment may be used for an optical filter of an imaging apparatus such as a camera. The imaging apparatus such as the camera may include: an optical filter; an imaging optical system having a plurality of lenses; and an imaging device which receives light having passed through the imaging optical system. The optical filter may have an electrochromic device, and an active device connected to the electrochromic device. The active device includes a transistor, and the transistor may be used as a switching device or an amplifying device. The optical filter may be arranged immediately in front of the imaging device of the imaging apparatus, or in between the plurality of lenses of the imaging optical system. In addition, the optical filter may be arranged so that an imaging optical system is arranged in between the imaging device of the imaging apparatus and the optical filter. In this case, the position can also be expressed as the outside of the imaging optical system.

The electrochromic device according to the present embodiment may be used for an electrochromic mirror to be used in automobiles and the like. The electrochromic mirror may have a reflecting member in addition to the electrode and the base member; and one of the pair of electrodes may be formed of a member having reflectivity, and one of the pair of base members may be formed of a member having reflectivity. The electrochromic mirror has an electrochromic device, and an active device connected to the electrochromic device. The electrochromic device according to the present invention may be used for windows of automobiles, airplanes and the like. The window has an operating unit for crew members and passengers to change transmittance.

Embodiments

Hereinafter, the present embodiment will be described more specifically with reference to embodiments, but the present embodiment is not limited to these embodiments.

Embodiment 1

(1) Manufacture of EC Device Framework

Figure 6A:
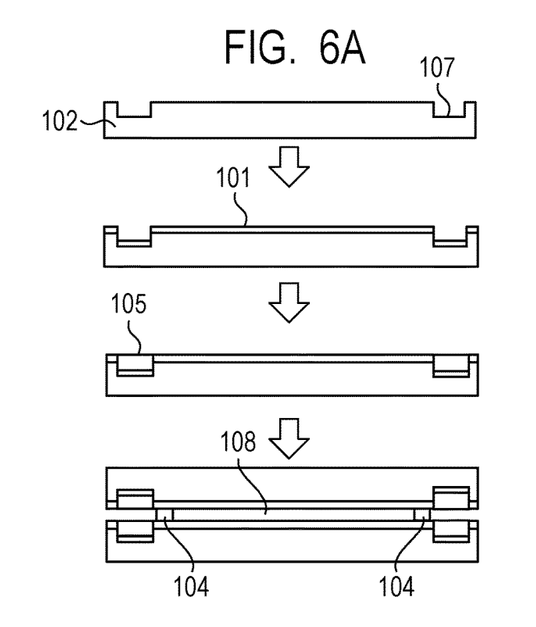
FIGS. 6A, 6B and 6C illustrate schematic diagrams for describing manufactures of EC device frameworks of embodiments.
Figure 6B:
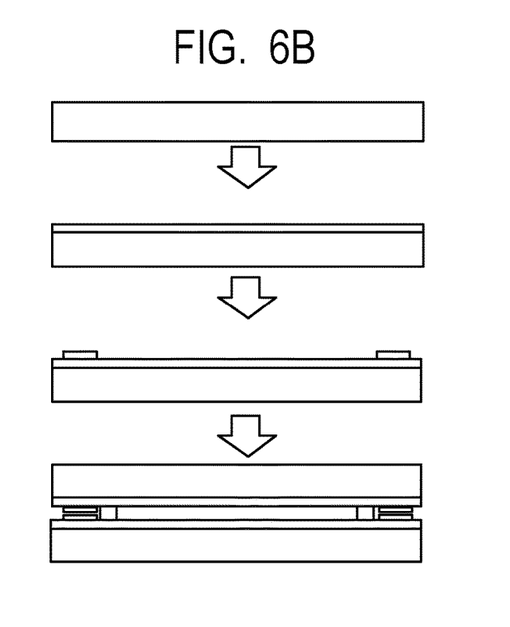
Figure 6C:
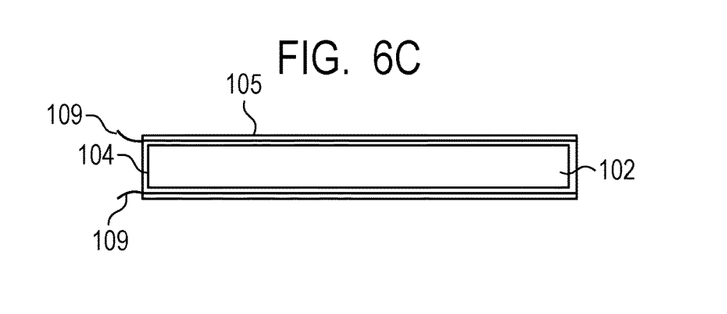

FIGS. 6A to 6C illustrate schematic diagrams for describing manufactures of EC device frameworks. FIG. 6A illustrates a view for describing a manufacture of an EC device framework of the embodiment, and FIG. 6B is a view for describing a manufacture of an EC device framework of a comparable example, any of which is a sectional view on the same plane as that in FIGS. 1A and 1B. In addition, FIG. 6C is a plan view of the EC device frameworks of the embodiment and the comparable example.

(1a) Manufacture of EC Device Framework of Embodiment

The EC device framework of the embodiment is manufactured as is illustrated in FIG. 6A. Firstly, a glass base member is prepared as a base member 102, in which a groove 107 (width 2 mm, and depth t μm) for forming each of bus bars having thicknesses t (=200, 150, 120 and 80) μm is formed by steps of resist formation and etching. To this base member 102, an indium tin oxide film (ITO) (thickness of 400 nm) is formed as an electrode 101 by sputtering, and a transparent electroconductive glass is prepared. Steps of printing/curing the Ag paste onto the groove 107 of the base member 102 are repeated, and thereby a bus bar 105 is formed which has a width W=2 mm and a thickness t μm. The resistivity ρ of the bus bar 105 at this time is $5 \times 10^{-5}$ Ωcm. After that, a UV curable sealing material mixed with spacer beads of 50 μm is coated as the partition wall 104. After that, the two base members 102 are overlapped so that the electrodes 101 face each other, and the sealing material is cured by being irradiated with UV light. Furthermore, a power feeding wire 109 is connected to an end of one side of the bus bar 105 by ultrasonic solder. Thereby, the two base members 102 are bonded, and the EC device framework is manufactured in which a distance between the electrodes is 50 μm, and an effective optical region is 10 mm (length in direction perpendicular to longitudinal direction of bus bar 105)×200 mm (length in direction parallel to longitudinal direction of bus bar 105).

(1b) Manufacture of EC Device Framework of Comparable Example

As illustrated in FIG. 6B, an EC device framework is manufactured in a similar way to that in the embodiment, except that the groove 107 for forming the bus bar is not formed in the base member 102. The thickness W of the bus bar 105 is 20 μm, and the distance between the bus bar 105 and a facing bus bar 105 is 10 μm.

(2) Injection of Electrolyte Solution

An electrolytic solution is prepared by dissolving 5,10-dimethyl-5,10-dihydrophenazine which is an anodic EC compound and heptyl viologen trifluoromethane sulfonate which is a cathodic EC compound, into propylene carbonate. At this time, the concentrations of the EC compounds contained in the electrolytic solutions are 100 mM, respectively. Next, this electrolyte solution is injected into the gap 108 which will become an EC layer, from an injection port (not shown) previously formed in the partition wall 104, then the gap 108 is sealed by the above described UV curable sealing material, and the EC device is obtained.

(3) Evaluation

A driving voltage of 0.62 V is applied to the EC device; and a distance (L) from the end of the effective optical region of the device on an end side to which the power feeding wire 109 has been affixed, a voltage drop, and a change in absorbance (ΔOD) from a decolored state to a colored state of the EC device are measured. The results are illustrated in FIGS. 7A and 7B.

Figure 7A:
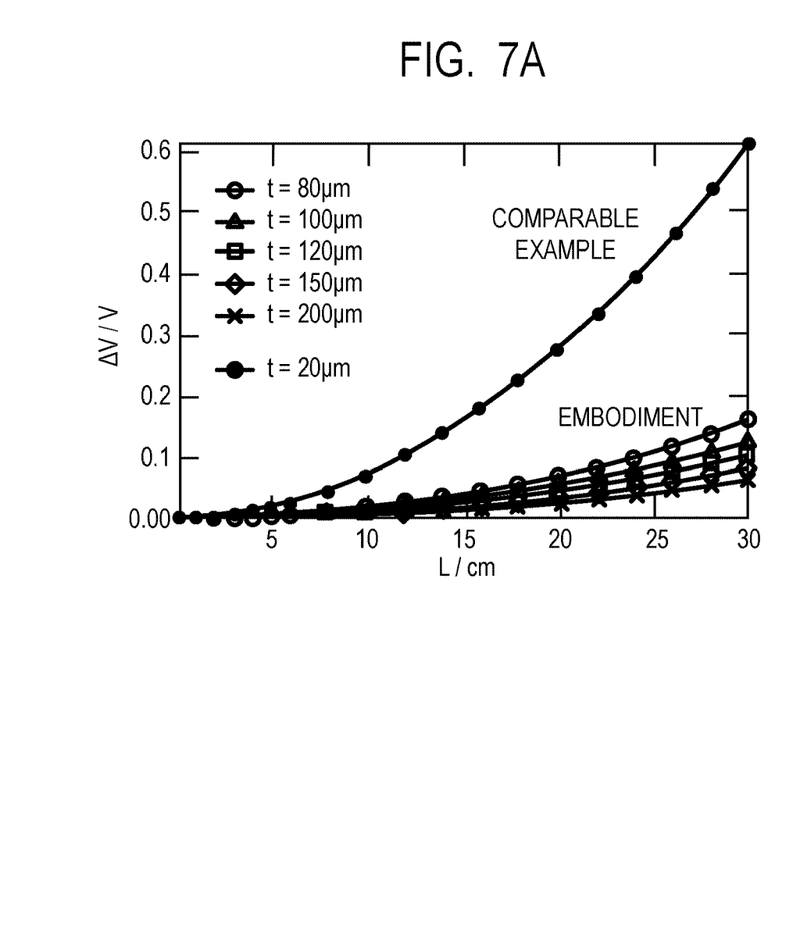
FIGS. 7A and 7B illustrate graphs showing a relationship between the length of the bus bar of the EC device in the embodiment and characteristics.

FIG. 7A illustrates a relationship between the distance L and the voltage drop at the time when the thickness of the bus bar has been changed. In the device of the embodiment, even when the distance between the electrodes is limited (in the present embodiment, the distance between the electrodes is 50 μm), a sufficiently large thickness of the bus bar can be secured. It is understood that because of this, the voltage drop can be greatly suppressed compared to that of the device of the comparable example.

Figure 7B:
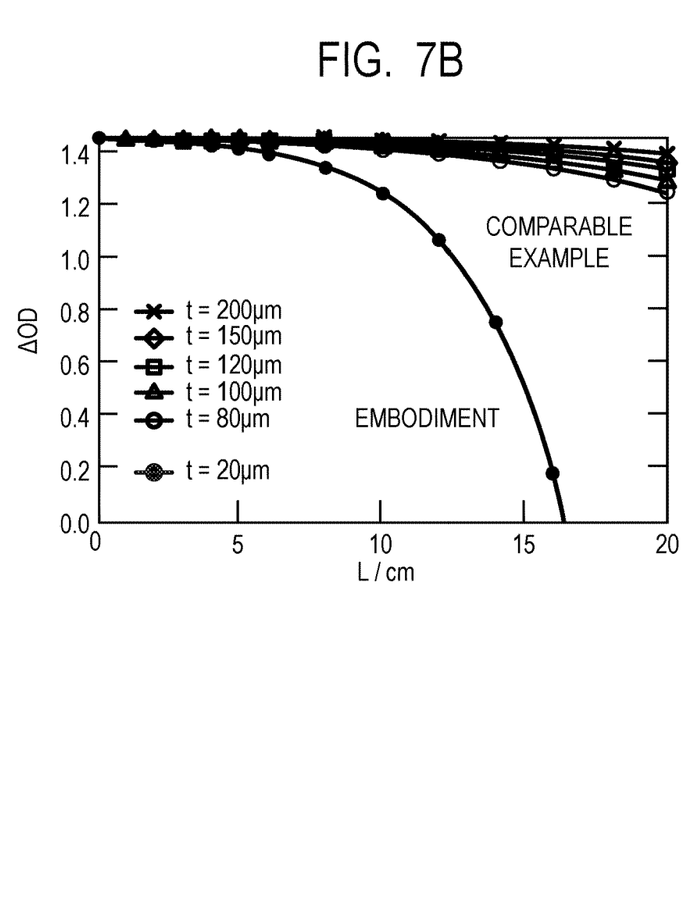

In addition, FIG. 7B illustrates a relationship between the distance L at the time when the thickness of the bus bar is changed and ΔOD at a wavelength of 605 nm of the EC device. It is understood from FIG. 7B that the device of the embodiment can reduce the voltage drop compared to the device of the comparable example, and accordingly can greatly suppress the decrease of ΔOD occurring with the increase of L. It is understood from the above description that the device of the embodiment is a device having such high coloring uniformity that adequate coloring characteristics can be obtained even in a region of L>16 cm, which is not almost colored in the device of the comparable example.

Embodiment 2

(1) Manufacture of EC Device Framework

Figure 8A:
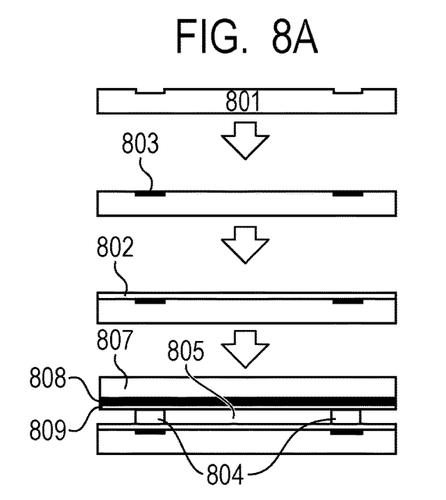
FIG. 8A is a sectional view for describing steps for manufacturing an EC device framework of the embodiment.
Figure 8B:
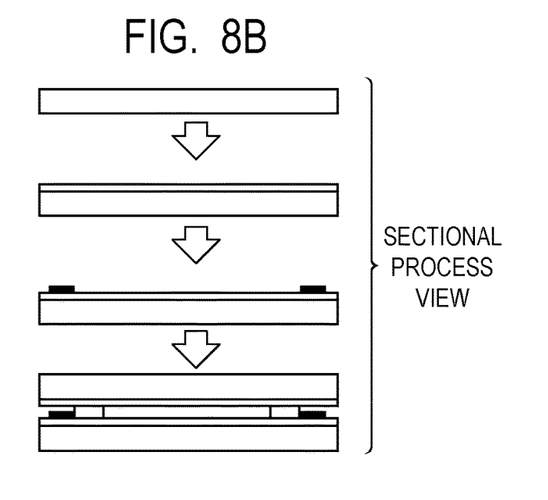
FIG. 8B illustrates a sectional view for describing steps for manufacturing an EC device framework of a comparable example.
Figure 8C:
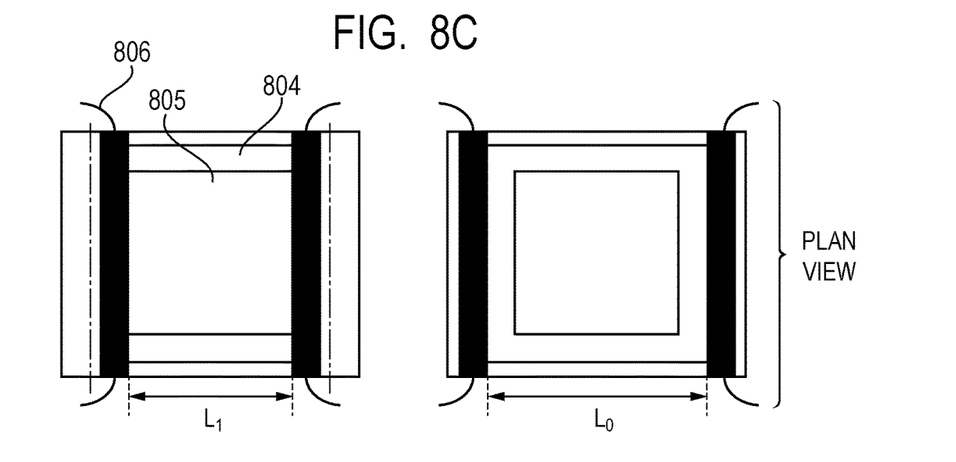
FIG. 8C illustrates a plan view of the EC device framework of the embodiment (left) and the comparable example (right).

FIGS. 8A to 8C illustrate schematic diagrams for describing manufactures of EC device frameworks. FIG. 8A illustrates a sectional view for describing steps for manufacturing an EC device framework of the embodiment; and FIG. 8B is a sectional view for describing steps for manufacturing the EC device framework of the comparable example. In addition, FIG. 8C illustrates a plan view of the EC device framework of the embodiment (left) and the comparable example (right).

(1a) Manufacture of EC Device Framework of Embodiment

The EC device framework of the embodiment is manufactured as is illustrated in FIG. 8A. Firstly, a glass base member 801 is prepared in which a groove for forming a bus bar having a thickness of 20 μm (width 2 mm and depth 20 μm) is formed by steps of resist formation and etching. Steps of printing/curing the Ag paste onto the groove of the base member are repeated, and thereby a bus bar (803) is formed which has a width W=2 mm and a thickness of 20 μm. A resistivity ρ of the bus bar at this time is $5 \times 10^{-5}$ Ωcm. The surface of the bus bar is flattened so as to become flush with the glass base member surface by a polishing process, and an indium tin oxide film (ITO) (thickness of 400 nm) is formed by sputtering to prepare a transparent electroconductive electrode. After that, a UV curable sealing material (804) which is mixed with spacer beads of 50 μm is applied as a partition wall. On the other hand, such a reflective electrode is prepared on a glass base member 807 that Ag is film-formed as a lower layer and ITO is film-formed as an upper layer by sputtering. Two base members are overlapped each other so that the reflective electrode sits on the transparent electrode while the electrodes face each other, and the sealing material is irradiated with UV light to be cured. Furthermore, the power feeding wire 806 is connected to both ends of the bus bar 803 by ultrasonic solder. Thereby, two base members are bonded, and a reflection type EC device framework is manufactured of which the distance between electrodes is 50 μm and the effective optical region is 20 mm×20 mm. The distance $L_1$ between the bus bars at this time is 20 mm.

(1b) Manufacture of EC Device Framework of Comparable Example

As is illustrated in FIG. 8B, the EC device framework of the comparable example is manufactured with the use of similar steps to those in the comparable example in Embodiment 1. The thickness W of the bus bar is 20 μm, and the distance $L_0$ between the bus bars is 24 mm.

(2) Injection of Electrolyte Solution

An electrolyte solution is injected and is sealed in a similar step to that in Embodiment 1, and thereby an EC device is obtained.

(3) Evaluation

The unevenness of coloring concentration in the colored state of the EC device is evaluated. Specifically, the colored states are compared between a portion in the vicinity of the bus bar, which is colored at the highest concentration in a colored region, and the central portion of the device. Specifically, ΔOD is measured at the time when a voltage of 0.62 V has been applied to the EC device and the EC device has been colored. The results are shown in Table 1.

TABLE 1

ΔOD characteristic in colored state of EC device

| | ΔOD in vicinity of bus bar | ΔOD in device center | Difference between ΔODs |
|---|---|---|---|
| Device of embodiment | 2.90 | 2.72 | 0.18 |
| Device of comparable example | 2.89 | 2.59 | 0.30 |

The device of the embodiment arranges the bus bar so that the surface of the bus bar becomes flush with the surface of the base member, has an electrode formed on the upper surface of the bus bar, and thereby suppresses that the bus bar becomes convex with respect to the electrode surface. The arrangement enables the seal to be arranged vertically on the bus bar, and enables the voltage drop due to the transparent electrode under the seal to be avoided. Due to this, as shown in Table 1, the device of the embodiment can improve the uniformity of the coloring concentration of the device compared to the device of the comparable example.

In addition, the device of the embodiment enables the seal to be arranged vertically on the bus bar, accordingly enables the bezel portion to become small by cutting the glass base member at the position indicated by the alternate long and short dash line in the left figure of FIG. 8C, and also enables the appearance to become clean.

Summarizing the above, it can be said that the following effects can be obtained from the embodiments of the present invention.

The surface layer of the base member, when being coated, can be coated uniformly so as to make steps small.

The degree of freedom for the arrangement of the bus bar can be enhanced.

A device with high coloring uniformity can be provided.

A size of the bezel portion can be reduced, and a quality of the appearance can be improved.

Embodiment 3

(1) Manufacture of EC Device Framework (1a) Manufacture of EC Device Framework of Embodiment An EC device framework in which the following three points are changed is manufactured by a similar technique to that in embodiment 1. A. Both of the groove depth for forming the bus bar and the thickness of the bus bar are set at 20 μm. B. A UV curable sealing material which is mixed with spacer beads of 25 μm is used as the partition wall, and thereby the distance between the electrodes is set at 25 μm. C. The effective optical region is set at 10 mm×10 mm.

(1b) Manufacture of EC Device Framework of Comparable Example

An EC device framework in which the following points are changed is manufactured by a similar technique to that in embodiment 1. A. The effective optical region is set at 10 mm×10 mm.

(2) Injection of Electrolyte Solution

An electrolyte solution is injected and is sealed in a similar step to that in Embodiment 1, and thereby an EC device is obtained.

(3) Evaluation

A driving voltage of 0.62 V is applied to the EC device for 10 s to color the EC device, and then a decoloring response time shown when the EC device is short-circuited is measured. The decoloring response time was calculated as a time period spent before ΔOD reaches 1/100 of that during coloring. The results are shown in Table 2.

TABLE 2

Decoloring response time of EC device

| | Decoloring response time/s |
|---|---|
| Device of embodiment | 0.286 |
| Device of comparable example | 0.715 |

The device of the embodiment can reduce the distance between the electrodes while keeping a sufficient thickness of the bus bar, by embedding the bus bar in the substrate. As a result, the device of the embodiment can achieve a device having a distance between electrodes (25 μm), which has been impossible in the device of the comparable example because the bus bars contact each other. Thereby, it can be understood that the device of the embodiment can greatly improve a decoloring response speed, compared to the device of the comparable example.

Summarizing the above, it can be said that the following effects can be obtained from the present embodiment.

The degree of freedom for the thickness of the bus bar can be enhanced.

The degree of freedom of the distance between the electrodes can be enhanced.

The response speed can be improved.

Summarizing the above, it can be said that the following effects can be obtained from the embodiments of the present invention.

Even devices in which the distance between the electrodes and the space of the bezel portion are limited can secure the thickness of the bus bar.

A voltage drop accompanying an expansion of the device can be reduced.

The decrease of ΔOD can be greatly suppressed.

A device with high coloring uniformity can be provided.

According to the present invention, an EC device can be provided which achieves both of the reduction of the resistance of the bus bar and space saving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-226815, filed Nov. 27, 2017, and Japanese Patent Application No. 2018-215220 filed Nov. 16, 2018 which are hereby incorporated by reference herein in their entirety.

What is claimed is:

1. An electrochromic device comprising:
a pair of base members;
a pair of electrodes arranged between the pair of base members;
an electrochromic layer arranged between the pair of electrodes; and
at least one bus bar electrically connected to one of the pair of electrodes,
wherein at least the one of the pair of electrodes and at least one of the pair of base members is provided with a groove,
wherein the at least one bus bar is provided in the groove of the at least the one of the pair of electrodes and the at least one of the pair of base members,
wherein an upper surface of the at least one bus bar is not flush with the electrode that is in contact with the at least one bus bar, and
wherein the groove does not pass through the electrochromic layer.

2. The electrochromic device according to claim 1, wherein electrical resistance of the at least one bus bar is smaller than electrical resistance of the electrode that is in contact with the at least one bus bar.

3. The electrochromic device according to claim 1, wherein a distance between the pair of electrodes is 100 μm or less.

4. The electrochromic device according to claim 1, wherein the pair of electrodes includes a first electrode and a second electrode,
wherein the pair of base members includes a first base member and a second base member,
wherein the first electrode is arranged on the first base member,
wherein the groove is provided at the first electrode, and
wherein, at the groove, a surface of the at least one bus bar is closer to a surface of the first base member than a surface of the first electrode.

5. The electrochromic device according to claim 1, wherein a surface of the at least one bus bar becomes flush with a surface of the at least one of the pair of base members, or is at a position recessed from the surface of the at least one of the pair of base members.

6. The electrochromic device according to claim 5, wherein the one of the pair of electrodes is arranged on the at least one bus bar.

7. The electrochromic device according to claim 1, wherein the at least one bus bar is arranged so that a longitudinal direction of the at least one bus bar is parallel to a longitudinal direction of the electrode that is in contact with the at least one bus bar.

8. An optical filter comprising the electrochromic device according to claim 1, and an active device connected to the electrochromic device.

9. An imaging apparatus comprising:
an imaging optical system having a plurality of lenses;
an imaging device which receives light having passed through the imaging optical system; and
the electrochromic device according to claim 1.

10. An electrochromic mirror comprising:
the electrochromic device according to claim 1;
an active device connected to the electrochromic device; and
a reflecting member which reflects light having passed through the electrochromic device.

11. The electrochromic mirror according to claim 10, wherein the reflecting member is one of the pair of base members.

12. A window comprising:
the electrochromic device according to claim 1; and
an operating unit for changing transmittance of the electrochromic device.

13. The electrochromic device according to claim 1, wherein the at least one bus bar is in contact with a side surface of the at least one of the pair of base members and a side surface of the at least the one of the pair of electrodes in the groove.

14. The electrochromic device according to claim 1, wherein the groove is filled with the at least one bus bar.

* * * * *